SANFORD & MALLORY.
Flax Brake.
No. 34,781. Patented March 25, 1862.
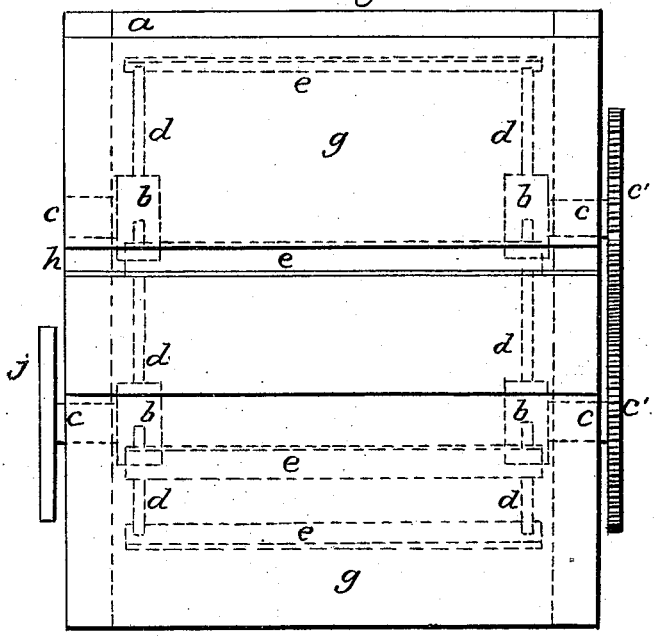
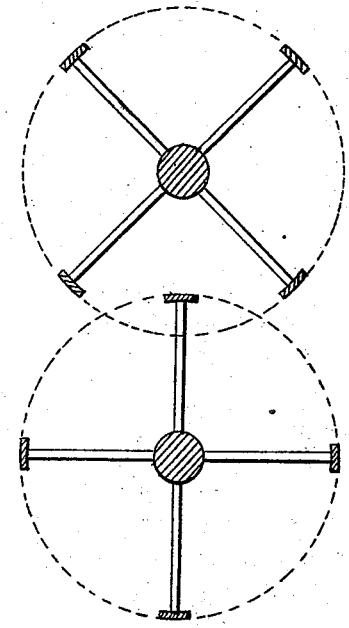
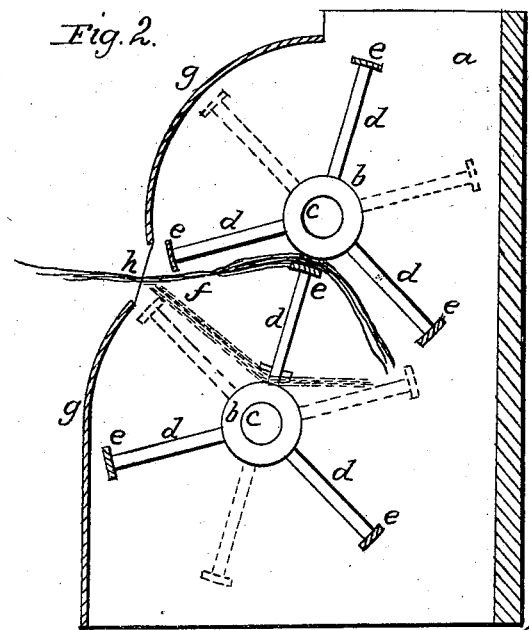
Witnesses:
Inventors:

007
UNITED STATES PATENT OFFICE.

GELSTON SANFORD AND JAMES E. MALLORY, OF NEW YORK, N. Y.

IMPROVEMENT IN MACHINERY FOR SCUTCHING FLAX AND HEMP.

Specification forming part of Letters Patent No. 34,781, dated March 25, 1862.

*To all whom it may concern:*

Be it known that we, GELSTON SANFORD and JAMES E. MALLORY, of the city, county, and State of New York, have invented a new and useful Improvement in the Machine for Scutching or Cleaning Flax, Hemp, and other like Fiber-Yielding Plants; and we do hereby declare that the following is a full, clear, and exact description thereof, reference being had to the accompanying drawings, making part of this specification, in which—

Figure 1 is a front elevation, and Fig. 2 a vertical section, of a machine on our improved plan.

The same letters indicate like parts in all the figures.

The operation of "scutching" flax, hemp, and such like fiber-yielding plants is the beating out or otherwise separating from the fibers the woody particles which have been previously broken up and partially loosened from their attachment to the fibers; and in performing this operation the desideratum is to effectually separate the woody part without serious injury to the fibers. Heretofore machines have been made for this purpose consisting of two series of scutching-bars attached to the outer extremities of arms on two parallel and rotating shafts geared to rotate with equal velocity and in opposite directions, so that in the rotation the scutching-bars should act on the broken flax or other plant alternately on opposite sides, the two series in their revolutions describing two circles intersecting each other, as in Fig. 3 of the accompanying drawings. Machines so constructed have not been efficient in practice, for the reason that the two series of scutching-bars cannot be set sufficiently close to have each series enter in the rotation to the required depth in the spaces between the bars of the other for efficient action, without carrying the fibers operated upon against the shafts, around which they will be wound; and unless the two series of bars can be set close they will only have a very short and inefficient action on the bunch of fibers.

The object of our invention is to increase the scutching action without serious injury to the fibers; and to this end our said invention consists in arranging two series of scutching-bars, each series secured to arms on two hubs without a connecting-shaft, the axes of rotation of the two series being parallel or nearly parallel, and the two sets of hubs geared so as to rotate with equal velocity, and placed so near that each series of scutching-bars shall in the rotation describe segments of circles within the spaces between the several bars of the other series, so that the flax or other plant to be scutched shall, by the rotation of the two series of bars, be alternately bent in opposite directions without coming in conflict with central shafts. This alternate bending of the fibers in opposite directions to the extent represented has the effect of loosening the woody particles from the fibers throughout the entire thickness of the bunch, and at the same time the scutching-bars are enabled to act at each revolution upon a much greater length of fiber without tendency to make tow.

In the accompanying drawings, *a* represents a suitable frame, and *b b b b* two sets of hubs on shafts *c c c c*, the two sets of hubs being geared by cog-wheels *c' c'*, to turn in opposite directions and with equal velocity. Each set of hubs *b b* carries two sets of radial arms, *d d*, of equal length—one set on each—and to the outer ends of these arms are secured scutching-bars *e e*, of any of the usual or suitable forms. The axes of the two sets of bars are at such distance apart and so geared that the scutching-bars on each set of hubs shall in the rotation pass near to the axes of the other set, and in the middle of the spaces between the others, as represented, the two sets alternately beating against the bunch of flax *f* on opposite sides, and bending it in opposite segments of circles, as represented by full and by dotted red lines. The two series of scutching-bars are covered by a casing, *g*, having an open space, *h*, through which the attendant can introduce the bunches of flax or other plant to be scutched. The shafts of one of the hubs is provided with a pulley, *j*, to which motion is communicated from any suitable motor. If desired, the outer faces of the scutching-bars, or some of them, may be armed with radial scutching-teeth to pass between the fibers.

We do not claim two series of scutching-bars on parallel or nearly parallel shafts geared to rotate in opposite directions, the bars of one series in the rotation passing in the spaces between the bars constituting the other series, as we are aware that this has long been known; but What we do claim is—

Arranging two series of scutching-bars on two sets of hubs and arms, or on two sets of heads or wheels as the equivalent thereof, the two series being geared to rotate in opposite directions and with equal velocity, and set so near that the bars constituting each series shall, in the rotation, pass in the spaces between the bars constituting the other series, and near to the axis of rotation, as herein described, and for the purpose set forth.

GELSTON SANFORD.
JAS. E. MALLORY.

Witnesses:
A. DE LACY,
PETER COOKE.